United States Patent
Kalmuk et al.

(10) Patent No.: US 10,956,215 B2
(45) Date of Patent: Mar. 23, 2021

(54) PREDICTIVE JOB ADMISSION CONTROL WITH FEEDBACK

(71) Applicant: International Business Machines Corporation, Armonk, NY (US)

(72) Inventors: David Kalmuk, Ontario (CA); Scott Douglas Walkty, Ontario (CA); Faizan Qazi, Ontario (CA); Patrick R. Perez, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 16/278,290

(22) Filed: Feb. 18, 2019

(65) Prior Publication Data

US 2020/0264928 A1    Aug. 20, 2020

(51) Int. Cl.
*G06F 9/50* (2006.01)
*G06F 9/48* (2006.01)
*G06N 5/02* (2006.01)

(52) U.S. Cl.
CPC .......... *G06F 9/5011* (2013.01); *G06F 9/4881* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 6,889,243 B1 * | 5/2005 | Hondou | G06F 9/4881 718/100 |
| 6,944,862 B2 | 9/2005 | Caggese et al. | |
| 7,712,100 B2 | 5/2010 | Fellenstein et al. | |
| 7,958,511 B1 * | 6/2011 | Pomerantsev | G06F 9/5027 718/104 |
| 8,555,281 B1 * | 10/2013 | van Dijk | G06F 9/4881 718/100 |
| 8,966,493 B1 * | 2/2015 | Richards | G06F 9/4887 718/104 |
| 9,910,704 B1 * | 3/2018 | Banerjee | G06F 9/505 |
| 10,534,655 B1 * | 1/2020 | Kinney, Jr. | G06F 9/5083 |
| 2003/0236961 A1 | 12/2003 | Qiu et al. | |

(Continued)

OTHER PUBLICATIONS

Deligiannis et al., "Adaptive Memory Management Scheme for MMU-Less Embedded Systems," 2016 11th IEEE Symposium on Industrial Embedded Systems (SIES), May 23-25, 2016, 8 pages.

(Continued)

*Primary Examiner* — Isaac T Tecklu

(74) *Attorney, Agent, or Firm* — Yee & Associates, P.C.

(57) ABSTRACT

Predictive job admission control is provided. In response receiving a job for execution, a predicted resource utilization estimate is generated for the job prior to admission of the job to execution. Historic job execution statistics corresponding to the job are searched for. It is determined whether corresponding historic job execution statistics were found during the search. In response to determining that corresponding historic job execution statistics were found during the search, the predicted resource utilization estimate for the job is adjusted based on the corresponding historic job execution statistics found during the search to form an adjusted resource utilization estimate. The job is scheduled for execution based on the adjusted resource utilization estimate.

20 Claims, 8 Drawing Sheets

(56) References Cited

U.S. PATENT DOCUMENTS

| | | | |
|---|---|---|---|
| 2004/0230675 A1 | 11/2004 | Freimuth et al. | |
| 2006/0288346 A1* | 12/2006 | Santos | G06F 9/5038 718/102 |
| 2007/0143765 A1* | 6/2007 | Aridor | G06F 9/5011 718/104 |
| 2010/0115526 A1* | 5/2010 | Mincarelli | G06F 9/5038 718/104 |
| 2011/0107341 A1* | 5/2011 | Longobardi | G06F 9/5094 718/102 |
| 2013/0024868 A1* | 1/2013 | Jeong | G06F 9/505 718/104 |
| 2015/0067688 A1* | 3/2015 | Nagasawa | G06F 9/4881 718/102 |
| 2015/0199216 A1* | 7/2015 | Cao | G06F 9/5027 718/104 |
| 2015/0199218 A1* | 7/2015 | Wilson | G06F 9/4881 718/104 |
| 2015/0254587 A1* | 9/2015 | Loffing | G06Q 10/06313 705/7.23 |
| 2015/0277987 A1* | 10/2015 | Di Balsamo | G06F 9/5083 718/104 |
| 2016/0098292 A1* | 4/2016 | Boutin | G06F 9/505 718/104 |
| 2020/0125963 A1* | 4/2020 | von Trapp | G06N 7/005 |

OTHER PUBLICATIONS

Setia, "The Interaction between Memory Allocation and Adaptive Partitioning in Message-Passing Multicomputers," IPPS '95 Proceedings of the Workshop on Job Scheduling Strategies for Parallel Processing, 1995, 19 pages.

Dhok, "Learning Based Admission Control and Tasks Assignment in MapReduce," Thesis Submitted in Partial Fulfillment of the Requirements for the Degree of MS by Research in Computer Science and Engineering, Jun. 2010, 107 pages.

Dhok et al., "Learning Based Opportunistic Admission Control Algorithm for MapReduce as a Service," Proceeding of the 3rd Annual India Software Engineering Conference, ISEC 2010, Mysore, India, Feb. 25-27, 2010, pp. 153-160.

Anonymous, "Prediction of Job Resource Usage based on Large Amount of Historical Data," An IP.com Prior Art Database Technical Disclosure, IPCOM000248232D, dated Nov. 10, 2016, 3 pages.

Gruska et al., "Sort-Aware Query Scheduling in Database Management Systems," CASCON '12 Proceedings of the 2012 Conference of the Center for Advanced Studies on Collaborative Research, Toronto, Ontario, Canada, Nov. 5-7, 2012, 2 pages.

"Workload Management," IBM PureData System for Analytics, Version 7.2.1, last updated Apr. 13, 2016, retrieved Feb. 7, 2019, 2 pages.

* cited by examiner

PREDICTIVE JOB ADMISSION CONTROL WITH FEEDBACK

BACKGROUND

1. Field

The disclosure relates generally to computer workload management and more specifically to automatically controlling workload job admission for execution by a computer based on predicted job resource utilization and execution time estimates and continuous real time job execution feedback data.

2. Description of the Related Art

Typically, workload management controls access to computer system resources for a workload executing on the computer system based on administrator-defined goals. A workload may be broadly defined as the total number of job requests made by users and applications on the computer system. However, an entire workload of a given computer system may be broken down into self-contained units, such as, for example, one job of the workload.

On a computer system many different applications may execute at the same time. The expectations for executing the workload are consistent execution times and predictable access to computer system resources, such as processors, memory, storage, network devices, and the like. Workload management fulfills these needs by controlling a workload's access to computer system resources based on specifications defined by a system administrator. The system administrator may classify work to service classes as one model for implementing user controls for workload management on a computer system. The classification mechanism uses workload attributes, such as transaction names, user identifications, or program names, which specific applications are known to use. In addition, the system administrator defines goals and importance levels for the service classes representing the application work. The goals define performance expectations for the work. Goals can be expressed as response times. The response time describes the duration for the work requests after they entered the computer system and until the application signals to the workload manager that the execution is completed.

SUMMARY

According to one illustrative embodiment, a computer-implemented method for predictive job admission control is provided. In response to a computer receiving a job for execution, the computer generates a predicted resource utilization estimate for the job prior to admission of the job to execution. The computer searches for historic job execution statistics corresponding to the job. The computer determines whether corresponding historic job execution statistics were found during the search. In response to the computer determining that corresponding historic job execution statistics were found during the search, the computer adjusts the predicted resource utilization estimate for the job based on the corresponding historic job execution statistics found during the search to form an adjusted resource utilization estimate. The computer schedules the job for execution based on the adjusted resource utilization estimate. According to other illustrative embodiments, a computer system and computer program product for predictive job admission control are provided.

DETAILED DESCRIPTION

Figure 1:
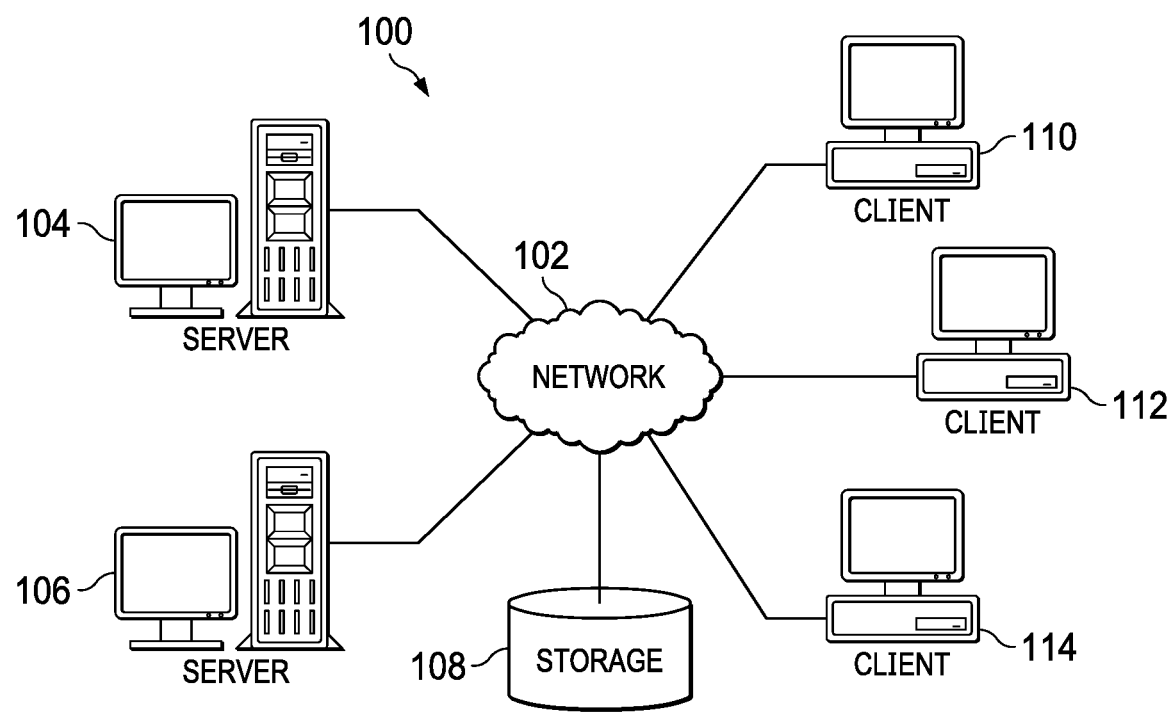
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
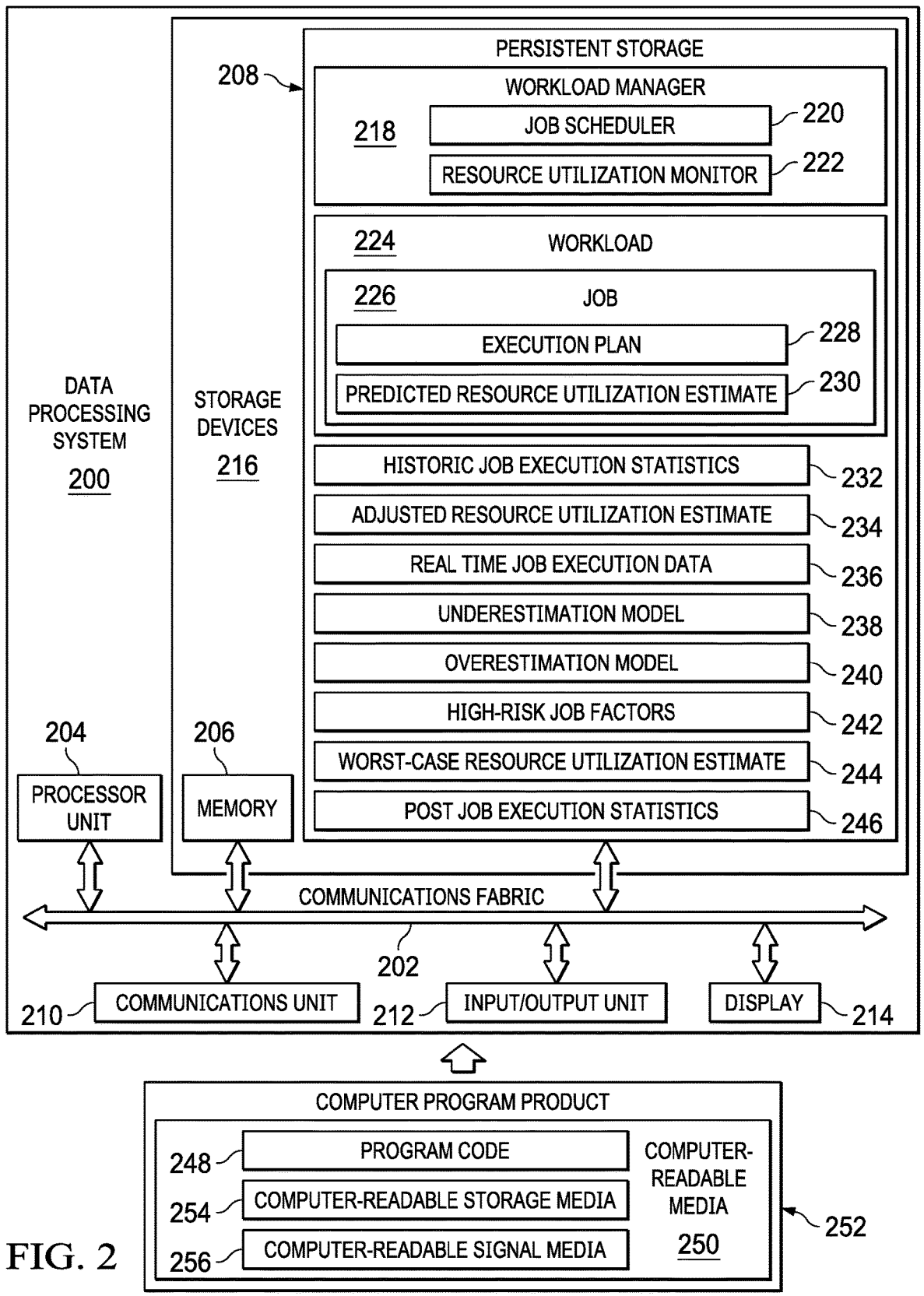
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may perform workload jobs, such as, for example, data query jobs, for requesting client devices. Further, server 104 and server 106 may control admission for job execution based on predicted job resource utilization and execution time estimates and continuous real time job execution feedback data. Also, it should be noted that server 104 and server 106 may each represent a cluster of servers in a data center environment. Alternatively, server 104 and server 106 may each represent a plurality of computing nodes in a cloud environment.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, kiosks, and the like. Users of clients 110, 112, and 114 may utilize clients 110, 112, and 114 to submit jobs, such as, for example, data queries, to server 104 and server 106 for execution.

Storage 108 is a network storage device capable of storing any type of data in a structured format or an unstructured format for retrieval. In addition, storage 108 may represent a plurality of network storage devices. Furthermore, storage unit 108 may store other types of data, such as authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores workload manager 218. However, it should be noted that even though workload manager 218 is illustrated as residing in persistent storage 208, in an alternative illustrative embodiment workload manager 218 may be a separate component of data processing system 200. For example, workload manager 218 may be a hardware component coupled to communication fabric 202 or a combination of hardware and software components. In another alternative illustrative embodiment, a first set of components of workload manager 218 may be located in data processing system 200 and a second set of components of workload manager 218 may be located in a second data processing system, such as, for example, server 106 in FIG. 1.

Workload manager 218 controls access to resources, such as processor unit 204 and memory 206, by workload jobs, such as, for example, data queries, executing on data processing system 200. Moreover, workload manager 218 controls admission of workload jobs to execution based on predicted resource utilization and execution time estimates for each incoming job to data processing system 200 and continuous real time feedback data corresponding to currently executing jobs on data processing system 200. In this example, workload manager includes job scheduler 220 and resource utilization monitor 222. However, it should be noted that job scheduler 220 and resource utilization monitor 222 may each be stand-alone components (i.e., not included in workload manager 218).

Workload manager 218 utilizes job scheduler 220 to schedule incoming jobs for execution based on a resource utilization and execution time estimate corresponding to each respective incoming job. Workload manager 218 utilizes resource utilization monitor 222 to continuously monitor, in real time, resource consumption of each currently executing job on data processing system 200. Furthermore, workload manager 218 utilizes resource utilization monitor 222 to record and store resource utilization and execution time statistics for each job that finished execution.

Workload 224 represents a total current job workload of data processing system 200. Workload 224 may consist of a plurality of different jobs having a plurality of different levels of complexity ranging from simple to complex. Job 226 represents one job in workload 224. Job 226 may be, for example, a data query. However, it should be noted that job 226 may represent any type of job that data processing system 200 is capable of executing and may represent a set of one or more same or different jobs.

Execution plan 228 and predicted resource utilization estimate 230 correspond to job 226. Execution plan 228 represents a strategy for executing job 226. Execution plan 228 may be, for example, a query execution plan, such as a structured query language (SQL) execution plan. A SQL relational database management system parses each query and uses a query optimizer to generate an execution plan for each query. The query execution plan is used to calculate the cost of execution of the corresponding query in terms of required resources, such as processor, memory, and input/output, and required time to execute. The query execution plan has a shape of a tree. The shape of the tree depends on statements in the query. Each node in the tree represents a query operator. Operators indicate how queries and statements are executed.

Predicted resource utilization estimate 230 represents an initial predicted estimate of resources required by data processing system 200 to execute job 226. It should be noted that predicted resource utilization estimate 230 also includes an execution time estimate as well. Workload manager 218 generates predicted resource utilization estimate 230 based on execution plan 228.

Historic job execution statistics 232 represent statistics corresponding to previously executed jobs on data processing system 200. Workload manager 218 may, for example, hash key attributes of job execution plans to form plan hashes that generalize these plans. In addition, workload manager 218 may index job execution statistics by plan hash. In other words, workload manager 218 is associating job execution statistics to a plan hash. Thus, similar job execution plans may result in a same plan hash and share the same statistics.

If workload manager 218 identifies a plan hash that is the same or similar to a hash of execution plan 228, then workload manager 218 utilizes the job resource utilization and execution time statistics corresponding to that particular plan hash to adjust, modify, or enhance the accuracy of initial predicted resource utilization estimate 230. In this example, adjusted resource utilization estimate 234 represents the adjustment or modification of initial predicted resource utilization estimate 230 based on the job resource utilization and execution time statistics corresponding to the particular plan hash that workload manager 218 identified as being the same or similar to the hash of execution plan 228.

Real time job execution data 236 represent feedback information corresponding to recently executed job resource utilization statistics on data processing system 200 over a variable sampling window. Resource utilization monitor 222 generates real time job execution data 236. Workload manager 218 utilizes real time job execution data 236 to determine whether predicted estimates of job resource utilization and execution time are accurate, underestimated, or overestimated.

If workload manager 218 determines that underestimation is occurring, then workload manager 218 applies underestimation model 238 to adjust predicted estimates to increase accuracy and prevent resource exhaustion or depletion. If workload manager 218 determines that overestimation is occurring, then workload manager 218 applies overestimation model 240 to adjust predicted estimates to increase accuracy and increase data processing system 200 performance by releasing overallocated resources of jobs.

High-risk factors 242 represent a set of criteria that workload manager 218 utilizes to determine whether a particular incoming job is a high-risk job for data processing system 200. High-risk factors 242 may include, for example, incoming jobs that do not have any corresponding historical resource utilization and execution time statistics, jobs having estimated resource consumption in excess of a predefined job resource consumption threshold level, jobs having a worst-case resource utilization estimate in excess of a predefined job worst-case resource utilization threshold level, or jobs having an estimated execution time in excess of a predefined execution time threshold level.

If workload manager 218 determines that a job is high-risk based on high-risk factors 242, then workload manager 218 applies worst-case resource utilization estimate 244 to predicted estimates to protect data processing system 200 from resource exhaustion and possible destabilization. Post job execution statistics 246 represent metrics or values corresponding to final resource consumption and execution times for jobs finished executing on data processing system 200. Resource utilization monitor 222 generates post job execution statistics 246. Workload manager 218 utilizes post job execution statistics 246 to adjust initial predicted resource utilization and execution time estimates for same or similar jobs waiting to be scheduled for execution.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Modern analytic data processing systems, such as data warehouses, big data clusters, and the like, are expected to be able to handle a diverse range of ad hoc queries and to be able to handle multiple jobs simultaneously. A challenge of designing such an analytic data processing system is how to implement workload management of jobs to ensure the jobs can be executed in a timely fashion without overcommitting the computer system resources or otherwise compromising the stability of the computer system. In such an analytic data processing system, fixed resources, such as memory, are typically a limiting factor so workload management primarily takes the form of a job admission control or scheduling subsystem where a limited number of jobs are allowed to execute on the computer system at a time and other jobs queue and wait to enter until enough running jobs leave the computer system so that the next job in the queue can be admitted for execution.

One design challenge for this type of job scheduling algorithm is how to decide which and how many jobs can be allowed to execute at one time. On a modern analytic data processing system, this design challenge is significantly complicated by the fact that individual jobs can have widely varying computer system resource requirements and execution characteristics, ranging from simple point queries that perform a lookup of a single record to complex analytic queries that need to process and aggregate billions of rows of data to produce a result. This variation in resources requirements and execution characteristics makes it exceedingly difficult to accurately predict an incoming job's resource requirements in order to make appropriate job admission decisions. This difficulty is further compounded by the requirement to handle a full range of these job types with significant concurrency. For example, a data warehouse would be expected to be able to handle multiple complex analytic queries and ongoing data ingestion, while also continuing to service thousands of operational point queries simultaneously.

Current workload management technologies in the market today sidestep the complexities of accurately predicting the computer system resource demands of incoming jobs by imposing constraints that can be more easily predicted. At the most basic level, these current workload management technologies operate through some combination of defined computer system resource caps for individual jobs and fixed concurrency limits on the number of jobs that will be allowed to execute at the same time. Both the resource caps and fixed concurrency limits are left to the system administrator to define. To allow this current workload management model to serve a wide variety of workloads, the system administrator is usually able to subdivide an incoming workload into a hierarchical grouping based on session or job-level attributes and then is able to apply these limits at the group or sub-group level.

While flexible, this current model of workload management suffers from several inherent drawbacks. For example, this current model requires the system administrator to define a fixed configuration to match the characteristics of the incoming workload on the computer system. Since most workloads cannot be easily characterized, this typically involves a labor intensive iterative tuning exercise by the system administrator where the workload management configuration is distilled and refined over a period of time, which is a significant operational burden. Also, because the workload management configuration is fixed, the configuration requires ongoing monitoring and maintenance to adjust the configuration to accommodate incremental workload changes, and potentially a full-scale retuning in the event of a substantial workload change. Even when well-tuned, the configuration can be inflexible and unreliable in the face of a dynamic and unpredictable workload. Usage of fixed concurrency limits or fixed resource caps in the face of heterogeneous jobs implicitly means that relatively complex jobs in the computer system may be overcommitted or may be starved of resources and execute sub-optimally. Conversely, in the face of relatively simple jobs, the computer system may be underutilized or these jobs may be allocated unneeded resources (i.e., an excess number of computer system resources not being consumed by these jobs). Working around these issues by attempting to subdivide the workload into different groupings based on known session attributes (e.g., authorization, application name, and the like) or job attributes (e.g., read, write, query cost estimate, and the like) and customizing the limits within the context of that grouping is an imperfect solution at best.

What is needed is a job admission control model that can perform fit-based admission of jobs based on actual resource demands and availability, rather than based on fixed limits. Fit-based job admission addresses the drawbacks of the current workload management model and provides a more efficient and autonomous solution. However, no single, well-defined fit-based admission strategy currently exists for an analytic data processing system.

Two general approaches can be taken to construct this type of fit-based workload management mechanism. One approach is predictive admission control and the other approach is reactive admission control. However, neither of these approaches alone is sufficiently reliable to manage an analytic data processing system for general workloads without making significant tradeoffs in computer system stability and efficiency.

For example, a predictive admission control model relies on the computer system to generate an estimate of resource requirements based on attributes of the incoming job. However, one problem with predictive admission control is how to obtain an estimate that is sufficiently accurate to implement effective job admission control without resorting to techniques, such as resource utilization caps or worst-case estimates, which significantly trade off efficiency to establish accurate peak estimates to avoid overcommitting computer system resources. A reactive admission control model on the other hand, which reactively adjusts job admission based on actual resource consumption by jobs already running in the computer system, will be vulnerable to the fact that it will only discover the resource consumption of jobs after they have already been admitted to the computer system. As a result, reactive admission control will risk letting in too many jobs and overcommitting the computer system.

Illustrative embodiments implement a predictive admission control mechanism for an analytic data processing system that performs fit-based admission of jobs based on available computer system resources and a computer system generated estimate of resource requirements for incoming jobs. Through this novel, multi-factor admission control approach, which blends predictive estimates, machine learning based on past executions, and a continuous job execution feedback-based error correction mechanism, illustrative embodiments are capable of maintaining stable computer system behavior in the face of a highly varied and highly concurrent dynamic mixed workload. In addition to achieving a high-level of accuracy in job admission estimates, illustrative embodiments are further able to maintain an efficient computer system utilization profile, thereby avoiding disadvantages of current workload management approaches. Thus, illustrative embodiments provide an adaptive workload management model that admits an optimal number of jobs into the computer system based on processor load and memory consumption, which provides better computer system performance by decreasing thrashing. Moreover, illustrative embodiments increase computer system stability by avoiding overcommitting the computer system resources, such as memory, and preventing out of memory errors. Out of memory is an undesirable computer system state where no additional memory can be allocated for use by applications or the operating system.

Thus, illustrative embodiments provide one or more technical solutions that overcome a technical problem with scheduling jobs for execution. As a result, these one or more technical solutions have a technical effect of increasing computer performance using predictive job admission control with real time job execution feedback.

Figure 3A:
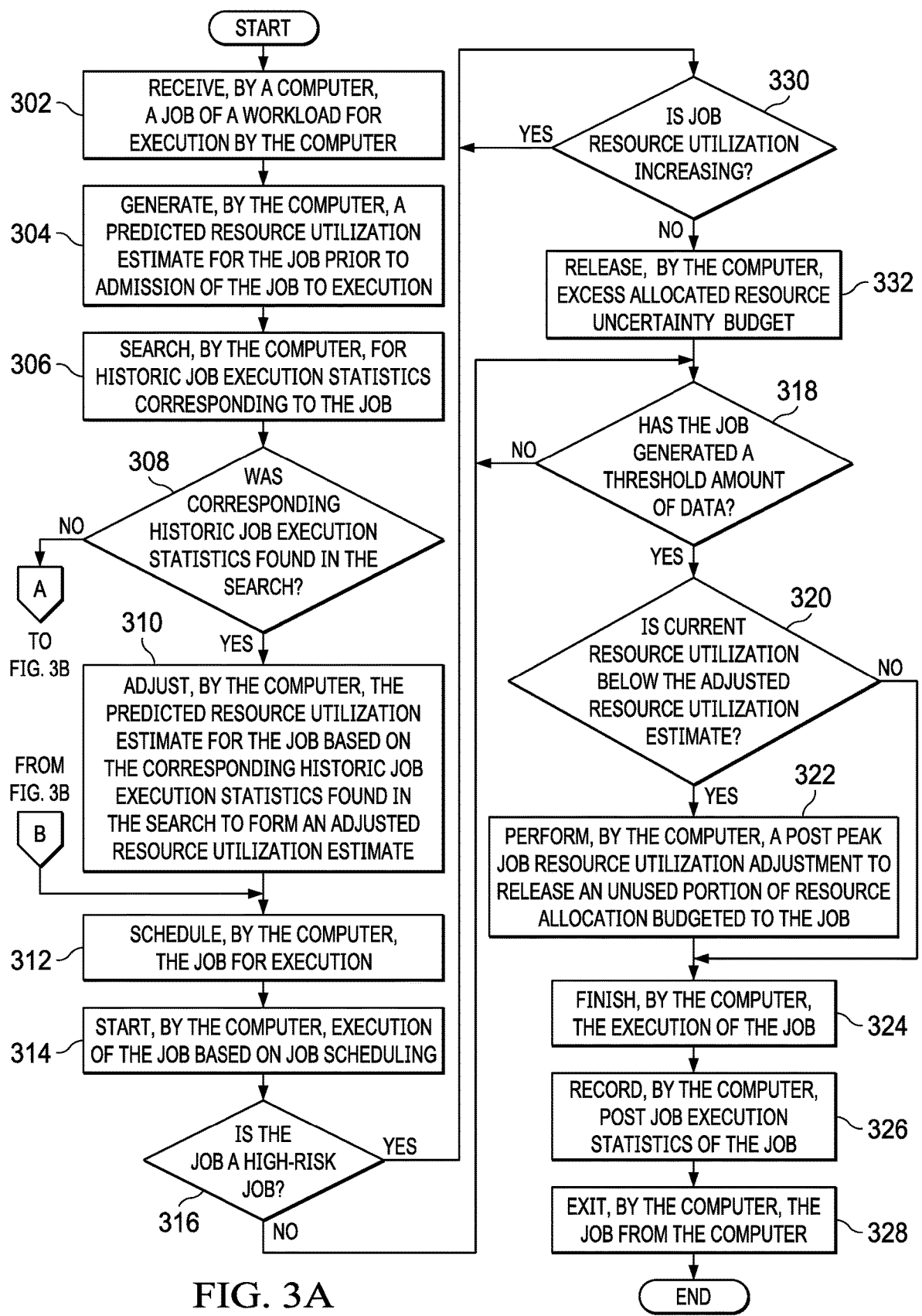
FIGS. 3A-3B are a flowchart illustrating a process for executing workload jobs using predictive job admission control in accordance with an illustrative embodiment.
Figure 3B:
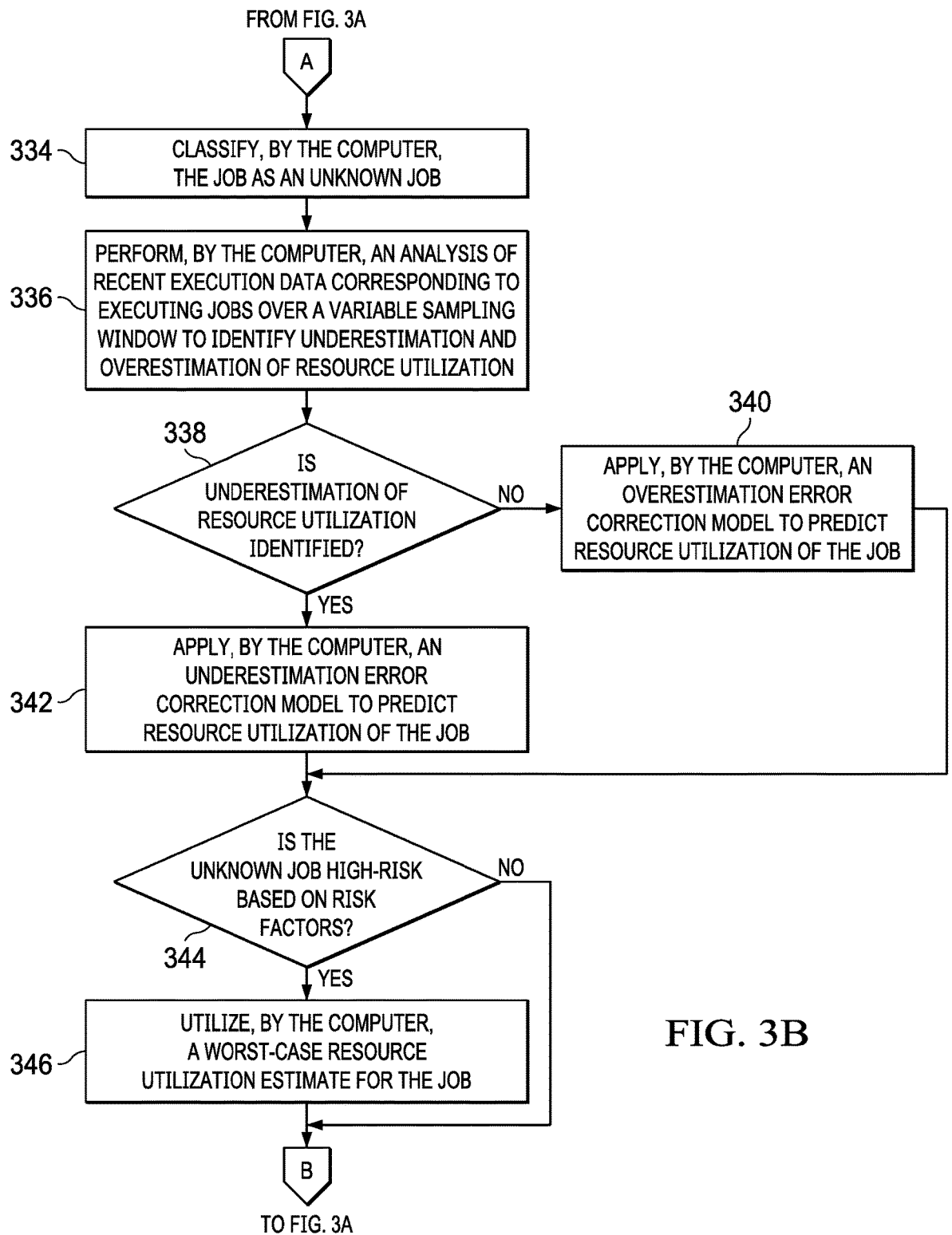

With reference now to FIGS. 3A-3B, a flowchart illustrating a process for executing workload jobs using predictive job admission control is shown in accordance with an illustrative embodiment. The process shown in FIGS. 3A-3B may be implemented in a computer, such as, for example, server 104 in FIG. 1 or data processing system 200 in FIG. 2.

The process begins when the computer receives a job of a workload for execution by the computer (step 302). In addition, the computer generates a predicted resource utilization estimate for the job prior to admission of the job to execution (step 304). When the job enters the computer, the computer generates a predictive estimate of resources the job will require to execute and the job's expected execution time. One resource of interest is memory, but the computer takes into consideration all resource consumption. The computer does not rely on any specific method of generating these initial predictive job resource utilization estimates, but illustrative embodiments require that an estimate be tailored to a particular job to achieve increased computer efficiency benefits. In this example, the computer utilizes a cost-based model approach with some special heuristics to generate both job resource utilization and execution time estimates.

The computer bases job admission control on working memory requirements of, for example, SQL jobs entering the computer. The computer generates a predictive memory estimate for an incoming query based on an aggregate of the memory requirements of individual operators within a query execution plan corresponding to that particular job. The computer generates the predictive memory estimates for the individual operators based on an operator specific memory model using table column type data and related distribution and cardinality estimates from available database runtime statistics. In order to place limits on query memory resource requirements, the computer applies a configurable working memory cap at the operator level. With this working memory cap in place, the computer can still scale query memory based on the relative complexity of the query execution plan, but also enforce limits that allow for concurrency and minimize the probability that extremely complex query execution plans could cannibalize themselves by attempting to claim more than 100% of the computer resources.

The generation of response time estimates is similar to relying on a cost estimate generated by a query optimizer, which builds off a cost model for individual operators incorporating column data types and database runtime statistics to produce a linearized estimate of computer resource utilization time (e.g., processor, memory, storage, I/O, network, and the like) for a given query execution plan. The computer takes that initial job resource utilization estimate and factors in the degree of intra-query parallelism the query execution plan will be executed with, to generate an initial response time estimate for the job.

Alternative illustrative embodiments may incorporate other methods for generating the predictive job resource utilization estimates. For example, alternative illustrative embodiments may utilize machine learning-based or machine learning-derived estimation models, which are trained using query execution plan operators and structure, and their corresponding column data types, cardinalities, and other runtime statistics, and the resulting resource and execution time consumption.

After generating the predicted resource utilization estimate for the job prior to admission of the job to execution in step 304, the computer searches for historic job execution statistics corresponding to the job (step 306). In this example, corresponding may mean that the historic job execution statistics are associated with a plan hash is the same or similar to a hash of the plan for the job. Subsequently, the computer makes a determination as to whether corresponding historic job execution statistics were found in the search (step 308).

If the computer determines that corresponding historic job execution statistics were not found in the search, no output of step 308, then the process proceeds to step 334. If the computer determines that corresponding historic job execution statistics were found in the search, yes output of step 308, then the computer adjusts the predicted resource utilization estimate for the job based on the corresponding historic job execution statistics found in the search to form an adjusted resource utilization estimate (step 310).

The computer adjusts or refines the initial job resource utilization and execution time estimate by applying information the computer has learned regarding same or similar jobs from past executions. The computer stores aggregate job resource consumption and execution time statistics for past same or similar job executions and leverages this information for current estimates for improved prediction accuracy. Rather than just using a straightforward approach of tracking past execution statistics for each unique job execution plan, the computer instead aggregates job resource consumption and execution time statistics indexed by a hash on key attributes of each job execution plan. This approach allows the computer to generalize these statistics from same or similar execution plans in order to leverage this statistics information without requiring an exact job execution plan match to maximize their value, while still retaining high predictive accuracy. If the computer identifies a corresponding job execution plan hash with the execution plan of the current job, then the computer substitutes the aggregate resource consumption and execution time statistics for the initial predictive estimates of the job, which improves the accuracy of the resource consumption and execution time estimates for the job.

The computer aggregates the resource consumption and execution time statistics from past query job executions indexed on a plan hash that the computer derives from the distinguishing key attributes of the SQL execution plan, which includes the operators and their sequence, operator arguments including object names, and other defining attributes, such as enablement of prefetching. This allows the computer to store and lookup statistics based on a SQL execution plan's fundamental attributes rather than the query's exact SQL text or the query's exact execution plan. In this way, the computer is able to generalize the applicability of these statistics to consider equivalent query plans that may differ slightly in the way their SQL text is written, and similar equivalent query plans, widening the usefulness of these statistics. In this example, the computer aggregates these job resource consumption and execution time statistics using an exponential moving average to incorporate data across multiple job executions. However, the computer weights more recent job executions more heavily than older job executions.

Further, the computer schedules the job for execution based on the adjusted resource utilization estimate (step 312). Once the computer calculates the final resource consumption and execution time estimate for the job, the computer passes the job along to the job scheduler, which determines when the job can run based on a fit-based calculation of the required versus the available computer resources for the job. While the computer may include some type of priority scheme to balance fairness of job execution and responsiveness, the computer will admit a job for execution only when all of the job's resource requirements can be met without overcommitting computer resources. In the case where insufficient computer resources are available, the computer instructs the job scheduler to queue the job, forcing the job to wait until currently running jobs exit the computer and free up enough resources for the job to be allowed to execute.

Furthermore, the computer starts execution of the job based on job scheduling (step 314). Once the job scheduler schedules a job, the job can begin execution with the stipulation that its required resources will be available for consumption. During execution of the job, a global process on the computer performs continuous real time monitoring of actual resource consumption in order to feed this information back into one of two error correction models (i.e., an underestimation error correction model or an overestimation error correction model). After starting execution of the job in step 314, the computer makes a determination as to whether the job is a high-risk job (step 316). If the computer determines that the job is not a high-risk job, no output of step 316, then the computer makes a determination as to whether the job has generated a threshold amount of data (step 318). The threshold amount of data may be, for example, one row of data.

If the computer determines that the job has not generated the threshold amount of data, no output of step 318, then the process returns to step 318 where the computer waits for the job to generate the threshold amount of data. If the computer determines that the job has generated the threshold amount of data, yes output of step 318, then the computer makes a determination as to whether current resource utilization of the job is below the adjusted resource utilization estimate (step 320). If the computer determines that the current resource utilization of the job is not below the adjusted resource utilization estimate, no output of step 320, then the process proceeds to step 324. If then the computer determines that the current resource utilization of the job is below the adjusted resource utilization estimate, yes output of step 320, then the computer performs a post peak job resource utilization adjustment to release an unused portion of resource allocation budgeted to the job (step 322).

In other words, the computer applies one final technique during job execution to improve the efficiency of job scheduling in the face of uncertain job resource consumption and execution time estimates. The computer leverages the fact that the computer learns more about a job as the job executes in order to reduce the allocated resource budget set aside by the job scheduler for the job when the computer determines that the computer overestimated the resource requirement for the job. In order to make this overestimation determination, the computer relies on the fact that in order for the job to generate a row of output data or process a row of data, the computer needs to run through the whole job execution plan tree, which means that the computer will have reached peak resource utilization at this point having had to do all the upfront allocation of constructs, such as hash tables used for joins and aggregation, vector buffering for sorts and filtering, and the like. During the continuous real time job execution feedback cycle, the computer identifies currently executing jobs that have returned their first row of data since the last polling cycle. If the computer detects that the current resource utilization of these currently executing jobs having returned at least a row of data is below the resource utilization estimates that the computer used for admission of the job to execution, then the computer reduces the aggregate resource consumption in the job scheduler to align with the new information obtained by the computer during execution of the job. This allows the computer to further refine and correct job resource utilization and execution time estimates postadmission to compensate for overestimation, without risking computer stability.

If a job has a worst-case estimate when the job is scheduled to execute (i.e., no same or similar job completed in the meantime allowing the computer to revise the estimate based on those historical statistics), then the computer performs two types of post admission adjustment for worst case estimates. The first type looks for resource utilization growth during execution of the job. If no growth is observed for "N" number of time intervals, such as, for example, three time intervals, then the computer reduces the resource utilization estimated to the greater of the current resource utilization or the original non-worst-case estimate. The second type is the same as for job queries with non-worst-case estimates. That is, once the computer generates a threshold amount of data, such as, for example, one row of data, the computer adjusts the resource usage for the job to the lower of the estimated resource utilization or the current resource utilization. If the job generates the threshold amount of data before the first type of post admission adjustment occurs, then only the second type of post admission adjustment takes place. That is, with both types of adjustment, the computer reduced from worst case maximum current resource utilization estimate to minimum current resource utilization estimate. And when the threshold generation of data occurs before the first type of post admission adjustment, then the computer does worst case minimum current resource utilization estimate directly. It should be noted that because the majority of large jobs will execute significantly longer than the minimum sampling window required to release the excess allocated resources, this allows the computer to improve its efficiency while retaining the protective benefits of the worst-case mechanism.

Subsequently, the computer, finishes the execution of the job (step 324). When the job completes execution and releases its resources, a workload manager notifies the job scheduler so that the job scheduler can determine whether any queued jobs can now begin execution. Furthermore, the computer records and stores post job execution statistics of the job (step 326). As part of the job exiting the computer, the computer aggregates resource consumption and execution time statistics of the job in a learning component of the workload manager and indexes the statistics by query execution plan hash to be leveraged for future scheduling decisions. Finally, the computer exits the job from the computer (step 328). Thereafter, the process terminates.

Returning again to step 316, if the computer determines that the job is a high-risk job, yes output of step 316, then the computer makes a determination as to whether resource utilization of the job is increasing (step 330). If the computer determines that resource utilization of the job is increasing, yes output of step 330, then the process returns to step 330 where the computer waits for the job to reach peak resource utilization. If the computer determines that resource utilization of the job is not increasing, no output of step 330, then the computer releases excess allocated resource uncertainty budget down to the greater of current resource utilization of the job or an original non-worst-case estimate (step 332). Thereafter, the process returns to step 318 where the computer determines whether the job generated a threshold amount of data.

Returning again to step 308, if the computer determines that corresponding historic job execution statistics were not found in the search, no output of step 308, then the computer classifies the job as an unknown job (step 334). Moreover, the computer performs an analysis of recent execution data corresponding to executing jobs over a variable sampling window to identify one of underestimation and overestimation of resource utilization (step 336). This step involves the computer applying a variable error correction adjustment to the job's resource utilization estimates based on the continuous real time monitoring of the workload manager's view of expected resource consumption on the computer as compared with the actual resource consumption, and adjusting accordingly. The computer utilizes a bimodal approach for this error correction using two distinct models to handle the cases of underestimation and overestimation of resource consumption on the computer. In other words, instead of the computer utilizing a single model that would address both of the underestimation and overestimation cases sub-optimally, the computer utilizes two distinct models, which are specifically configured to manage each particular case.

The calculation of expected job resource consumption as compared to actual job resource consumption bears some mention since the calculation includes two nonobvious elements. It should be noted that the computer bases its error correction calculation on a recent snapshot of workload activity (i.e., real time job execution feedback data), with the understanding that workload dynamism may render any job resource consumption and execution time pattern the computer detects invalid within a longer sampling window. At the same time, the average job execution time can vary drastically based on the workload. As a result, it is undesirable for the computer to be looking at a short sampling window relative to full execution of an average job where the computer is deriving meaningless patterns. To account for this, the computer calculates the error correction based on a worst-case delta of estimated versus actual resource consumption within a variable sampling window that is proportional to the average job execution time. The average job execution time may be, for example, from a minimum of one minute up to a maximum of thirty minutes. This allows the computer to select a recent window of consideration for error correction calculations, but avoid picking a sampling window so short that it does not capture the full range of execution behavior for the average query job.

Tiering of job resource utilization and execution time statistics further enhances this approach by allowing the computer to tailor a variable sampling window to each respective tier of statistics. A second aspect of this error correction adjustment is that because sampling is periodic and interval-based, the job resource utilization may be different at the point the computer actually applies the error correction adjustment in the job scheduler. To account for this, the computer calculates and applies the error correction adjustment as a percentage adjustment against the job scheduler's current view of job resource consumption making the assumption that what the computer is observing is an error rate and not an absolute deviation.

However, a risk exists using this approach. For example, during a rapid increase in resource consumption, scaled error correction may result in the computer applying an unreasonably large delta adjustment. A pathological example would be that the computer calculates an expected memory consumption of 5 MB and observes an actual memory consumption of 10 MB. However, by the time the computer makes the error correction adjustment, the expected memory consumption may now be 50 GB. Applying an error correction of +50 GB (i.e., an extrapolation of 10000 times the error rate observed by the computer) has a high risk of overestimating the error and producing unwanted efficiency consequences since the computer sampling only represented 0.02% of the current resource consumption. To mitigate this effect, the computer caps the error rate applied to the absolute delta in a previous sampling window. In the case where this underestimates the total error, the computer continues to make error correction adjustments on subsequent cycles. Therefore, the computer only applies the scaling in a downward manner ensuring that the computer does not overcorrect in the case where resource utilization dropped by the time the computer made the error correction adjustment.

The computer makes a determination as to whether overestimation of resource utilization is identified based on the analysis of the real time execution data (step 338). If the computer determines that overestimation of resource utilization is not identified based on the analysis of the real time execution data, no output of step 338, then the computer applies an underestimation error correction model to predict resource utilization of the job (step 340). Thereafter, the process proceeds to step 344.

In the case of underestimation, where the computer is consuming more resources than the job scheduler has budgeted for, the computer needs to reign in job scheduling to compensate for the difference between expected and actual job resource consumption and avoid potential resource exhaustion. To ensure the mechanism is both efficient and robust, the computer utilizes a hybrid reactive and predictive error correction mechanism. The reactive mechanism involves continually adjusting the job scheduler's view of job resource consumption based on the actual measured consumption on a repeating periodic interval. In addition to this reactive mechanism, once the computer resource utilization exceeds a predefined resource utilization threshold, such as, for example, 75%, the computer further applies a predictive error correction mechanism on resource utilization estimates based on the recent error rate of any incoming jobs whose estimates were not adjusted in step 310. The computer applies this predictive error correction in order to ensure that the computer is able to effectively compensate for underestimation before the computer schedules these jobs and, thereby, avoids any possibility of the underestimation leading to over admission of jobs and resource exhaustion. The computation of the expected versus actual resource consumption that the computer bases its error correction calculations on are based on a recent snapshot of workload activity on the computer over a variable sampling window. However, it should be noted that the computer also applies at least two non-obvious techniques leveraging a variable sampling window to help ensure the robustness of the computation and capping the delta error correction to avoid error scaling issues.

Returning again to step 338, if the computer determines that overestimation of resource utilization is identified based on the analysis of the real time execution data, yes output of step 338, then the computer applies an overestimation error correction model to predict resource utilization of the job (step 342). In the case of overestimation, the computer is consuming less resources than the job scheduler has budgeted for. The computer compensates to correct the differential between expected and actual to avoid incurring inefficiencies over an extended period of time. However, the computer wants to correct the differential in a conservative or incremental manner to minimize the risk of overcompensating in the face of an unpredictable or volatile workload. The computer leverages two techniques to implement this reactively in a reliable manner.

The first technique is to leverage a variable sampling window similar to that used by the underestimation error correction model above to ensure the computer has a reliable value for the error. The second technique is that the computer applies the error correction to the job scheduler in an incremental manner so that in the case of chronic overestimation, the computer will eventually correct the job scheduling and eliminate the error completely. In the case of a more transient overestimation condition, the computer will be able to reconcile the job scheduling accounting when alternating between overestimation and underestimation scenarios, without large swings in behavior, which risks destabilizing the computer.

As a further refinement to both the underestimation and overestimation error correction models, the computer adds to the error correction mechanism by partitioning the tracking of the workload into several tiers to improve accuracy based on estimated response times and performing error correction individually within each tier. One reason for the added error correction mechanism is that jobs with similar response times tend to behave more uniformly in terms of resource consumption and estimation inaccuracies as opposed to jobs with very different response times. In other words, short jobs will tend to consume less resources and have a smaller window of error as opposed to large jobs, which tend to consume more resources and have larger error variations. Using these error correction models, the computer applies one additional constraint. The additional constraint is that a given tier must exceed some fixed minimum resource consumption before the computer will apply any predictive error correction adjustment. This ensures that the computer does not run into any pathological scenarios where an error correction adjustment derived from a small sample of minuscule jobs gets inappropriately extrapolated to a massive error correction adjustment in the face of a larger number of jobs, which may otherwise destabilize the computer.

Afterward, the computer makes a determination as to whether the unknown job is a high-risk job based on risk factors (step 344). If the computer determines that the unknown job is not a high-risk job based on the risk factors, no output of step 344, then the process returns to step 312 where the computer schedules the job based on the predicted resource utilization estimate made by one of the underestimation or overestimation error correction models. If the computer determines that the unknown job is a high-risk job based on the risk factors, yes output of step 344, then the computer utilizes a worst-case resource utilization estimate for the job (step 346). Thereafter, the process returns to step 312 where the computer schedules the job based on the worst-case resource utilization estimate for the job.

Step 346 provides an alternate adjustment that the computer applies to the predicted resource utilization estimate made by either the underestimation or overestimation error correction model for any large job that the computer determines to carry risk to the computer's stability. The effectiveness of alternate adjustment rests upon the computer's ability to derive reasonable predictive estimates for incoming jobs and compensate for any estimate inaccuracy incurred via continuous real time job execution feedback data. One vulnerability for this alternate adjustment is a scenario where the computer observes a sudden influx of jobs that require a significant percentage of computer resources and the computer's predictive estimates significantly underestimate the actual resource requirements of these jobs. In this scenario, the job scheduler admits too many of these jobs for execution and with these jobs tying up resources, the real time job execution feedback mechanism would be unable to effectively compensate, leading to resource exhaustion. To avoid this scenario, the computer employs a technique where the computer switches to an alternate worst-case estimate that adds an additional resource uncertainty allowance for jobs that the computer has no historical statistics on and that exceed a specific resource or runtime criteria. The mechanism includes two additional refinements in order to mitigate the efficiency reduction that would normally be incurred by these padded resource utilization estimates. First, for jobs waiting to be scheduled, the computer updates the job resource utilization estimates based on any new statistics the computer receives while the job is in queue to narrow the scenarios where the computer has to apply the worst-case estimate. It should be noted that this is a general mechanism that has additional value in the case of worst-case estimates. Second, the computer will release the excess resource uncertainty allowance allocated to the job at runtime as soon as the computer determines that it is safe to do so (i.e., once the computer determines that the job has likely reached peak resource consumption).

Worst-case job resource estimates that incorporate the additional resource uncertainty allowance are applied to any job that is deemed to be high-risk to the computer. The computer relies on four factors or criteria to make this high-risk determination. The first criterion is that the computer has no historical statistics corresponding to a given job. In other words, the resource utilization estimate for that job is based entirely, on the prediction model which greatly increases the probability of inaccuracy. The remaining factors relate to determining whether the job is significant enough to risk impacting computer stability in the face of inaccurate resource utilization estimates. Of the jobs that have no corresponding historical statistics, the computer considers as high-risk any job where the estimated consumption of any resource exceeds 15% of computer capacity, where the worst-case resource utilization estimate of any job exceeds 25%, or where any job that is expected to execute for greater than 30 seconds. The rationale is that these three factors provide the computer with a higher probability of detecting a job where the absolute deviation in resource utilization estimates could be substantial without being so heavy-handed that the computer would apply worst-case estimates to all jobs that have no corresponding historical information. Specific thresholds were arrived at experimentally by running multiple classes of workloads and observing behavior of these workloads. Alternative illustrative embodiments may leverage different specific factors and thresholds to classify high-risk jobs, including models derived through machine learning. It is also conceivable that some of the factors may dynamically being adjusted continuously based on current computer conditions.

To calculate the worst-case resource utilization estimate for a job, the computer relies on a cap or limit placed on the maximum amount of resources a single query operator may consume. It should be noted that alternative illustrative embodiments may use a different mechanism to determine worst-case resource utilization. While this is intended to ensure that all operators leave sufficient resources for other operators in complex query execution plans, it also gives the computer a reliable worst-case resource utilization estimate for individual operators. By combining these worst-case estimates, instead of combining the initial job resource utilization estimates generated in step 304, the computer is able to obtain an overall worst-case estimate for a job, which provides a more reliable bound in the face of uncertainty.

Figure 4:
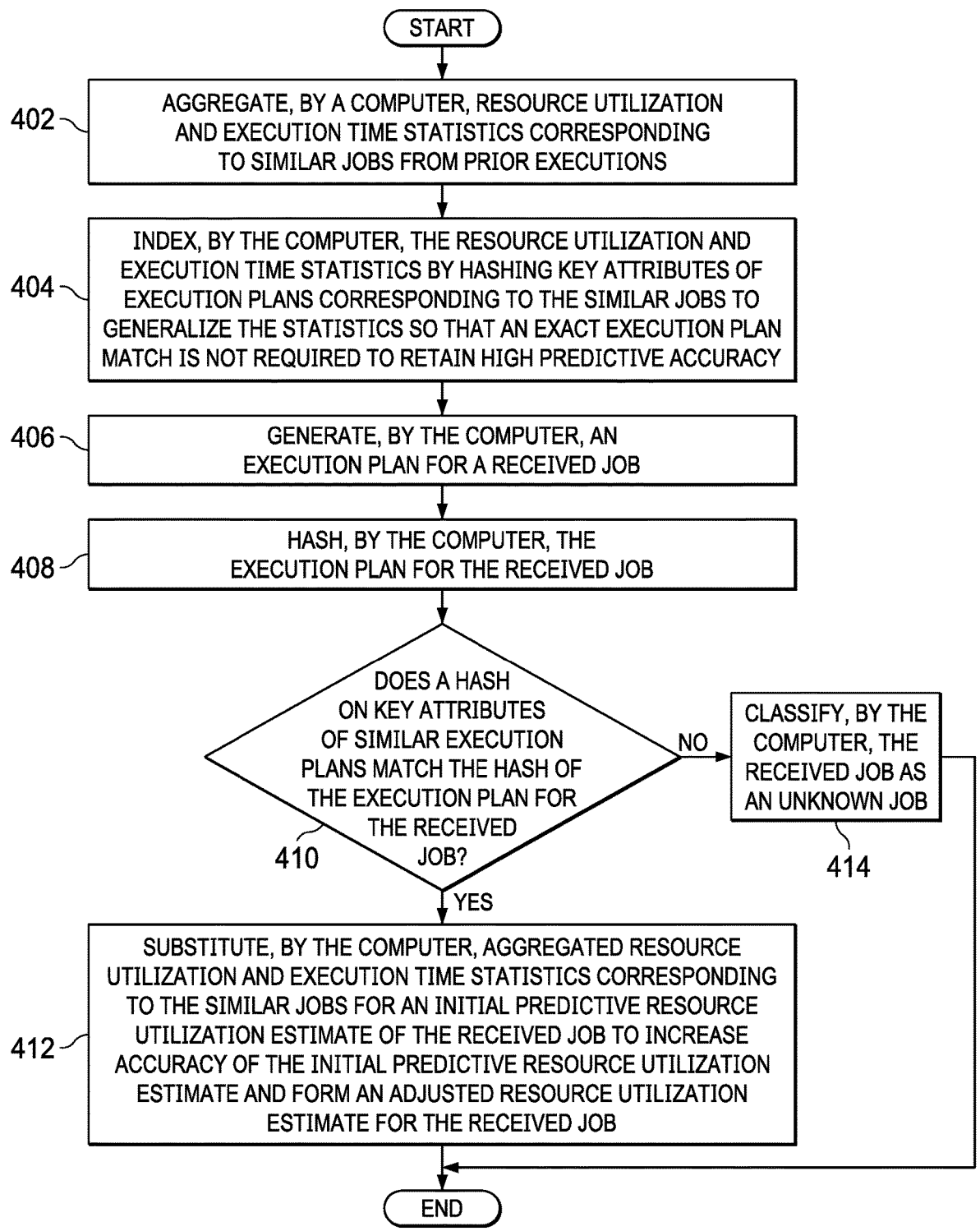
FIG. 4 is a flowchart illustrating a process for adjusting an initial job resource utilization estimate in accordance with an illustrative embodiment.

With reference now to FIG. 4, a flowchart illustrating a process for adjusting an initial job resource utilization estimate is shown in accordance with an illustrative embodiment. The process shown in FIG. 4 may be implemented in a computer, such as, for example, server 104 in FIG. 1 or data processing system 200 in FIG. 2.

The process begins when the computer aggregates resource utilization and execution time statistics corresponding to similar jobs from prior executions (step 402). The computer indexes the resource utilization and execution time statistics by hashing key attributes of execution plans corresponding to the similar jobs to generalize the statistics so that an exact execution plan match is not required to retain high predictive accuracy (step 404).

The computer generates an execution plan for a received job (step 406). The computer hashes the execution plan for the received job (step 408). The computer makes a determination as to whether a hash on key attributes of similar execution plans matches the hash of the execution plan for the received job (step 410). If the computer determines that a hash on key attributes of similar execution plans does match the hash of the execution plan for the received job, yes output of step 410, then the computer substitutes aggregated resource utilization and execution time statistics corresponding to the similar jobs for an initial predictive resource utilization estimate of the received job to increase accuracy of the initial predictive resource utilization estimate and form an adjusted resource utilization estimate for the received job (step 412). Thereafter, the process terminates. If the computer determines that a hash on key attributes of execution plans does not match the hash of the execution plan for the received job, no output of step 410, then the computer classifies the received job as an unknown job (step 414). Thereafter, the process terminates.

Figure 5:
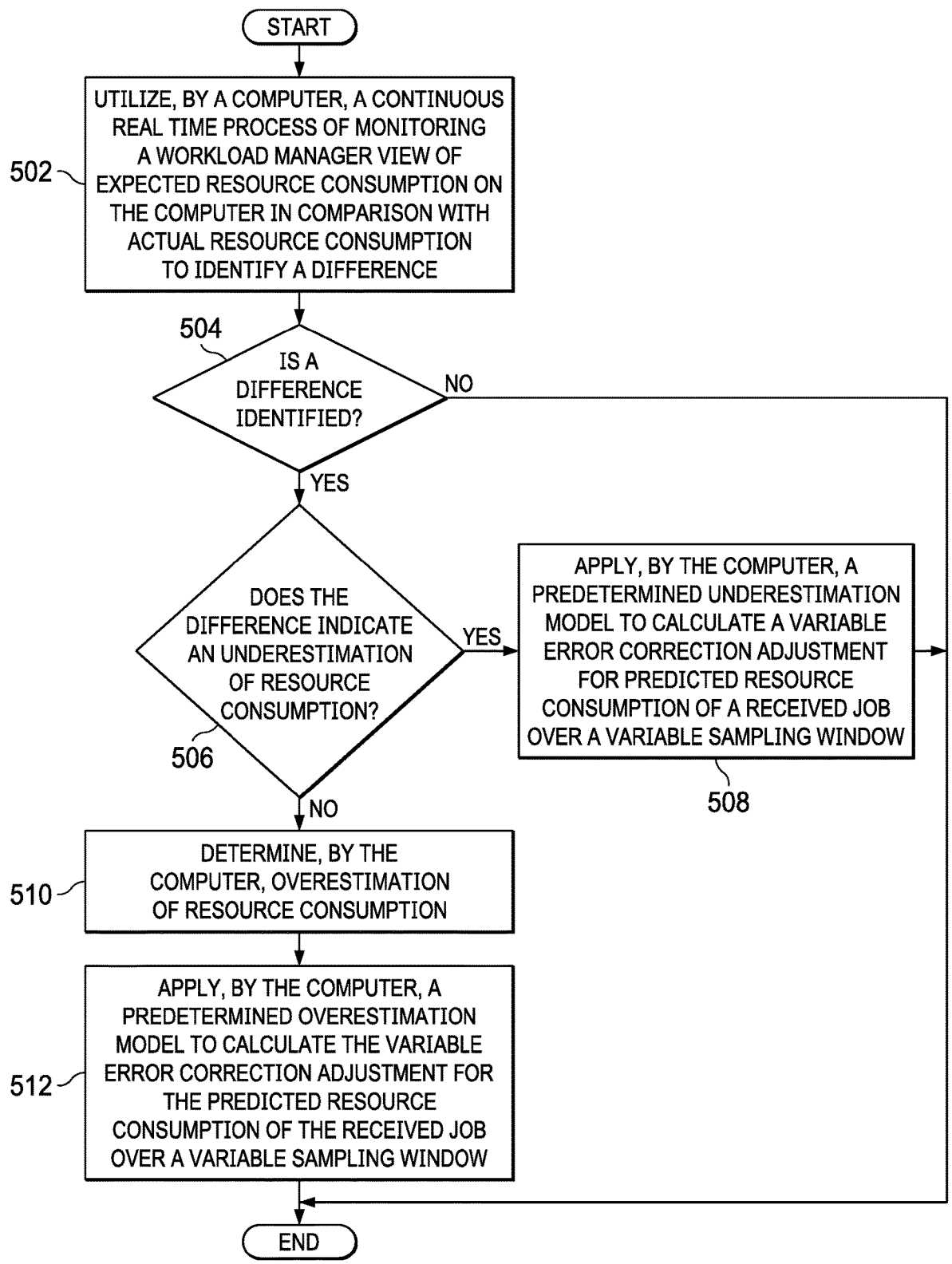
FIG. 5 is a flowchart illustrating a process for applying a variable error correction adjustment for predicted job resource consumption using either an underestimation or overestimation model based on recent job execution feedback data over a variable sampling window in accordance with an illustrative embodiment.

With reference now to FIG. 5, a flowchart illustrating a process for applying a variable error correction adjustment for predicted job resource consumption using either an underestimation or overestimation model based on recent job execution feedback data over a variable sampling window is shown in accordance with an illustrative embodiment. The process shown in FIG. 5 may be implemented in a computer, such as, for example, server 104 in FIG. 1 or data processing system 200 in FIG. 2.

The process begins when the computer utilizes a continuous real time process of monitoring a workload manager view of expected resource consumption on the computer in comparison with actual resource consumption to identify a difference (step 502). The computer makes a determination as to whether a difference is identified (step 504). If the computer determines that a difference is not identified, no output of step 504, then the process terminates thereafter. If the computer determines that a difference is identified, yes output of step 504, then the computer makes a determination as to whether the difference indicates an underestimation of resource consumption (step 506).

If the computer determines that the difference does indicate an underestimation of resource consumption, yes output of step 506, then the computer applies a predetermined underestimation model to calculate a variable error correction adjustment for predicted resource consumption of a received job over a variable sampling window for input to the underestimation model (step 508) and the process terminates thereafter. If the computer determines that the difference does not indicate an underestimation of resource consumption, no output of step 506, then the computer determines overestimation of resource consumption (step 510). Afterward, the computer applies a predetermined overestimation model to calculate the variable error correction adjustment for the predicted resource consumption of the received job over the variable sampling window for input to the overestimation model (step 512) and the process terminates thereafter.

Figure 6:
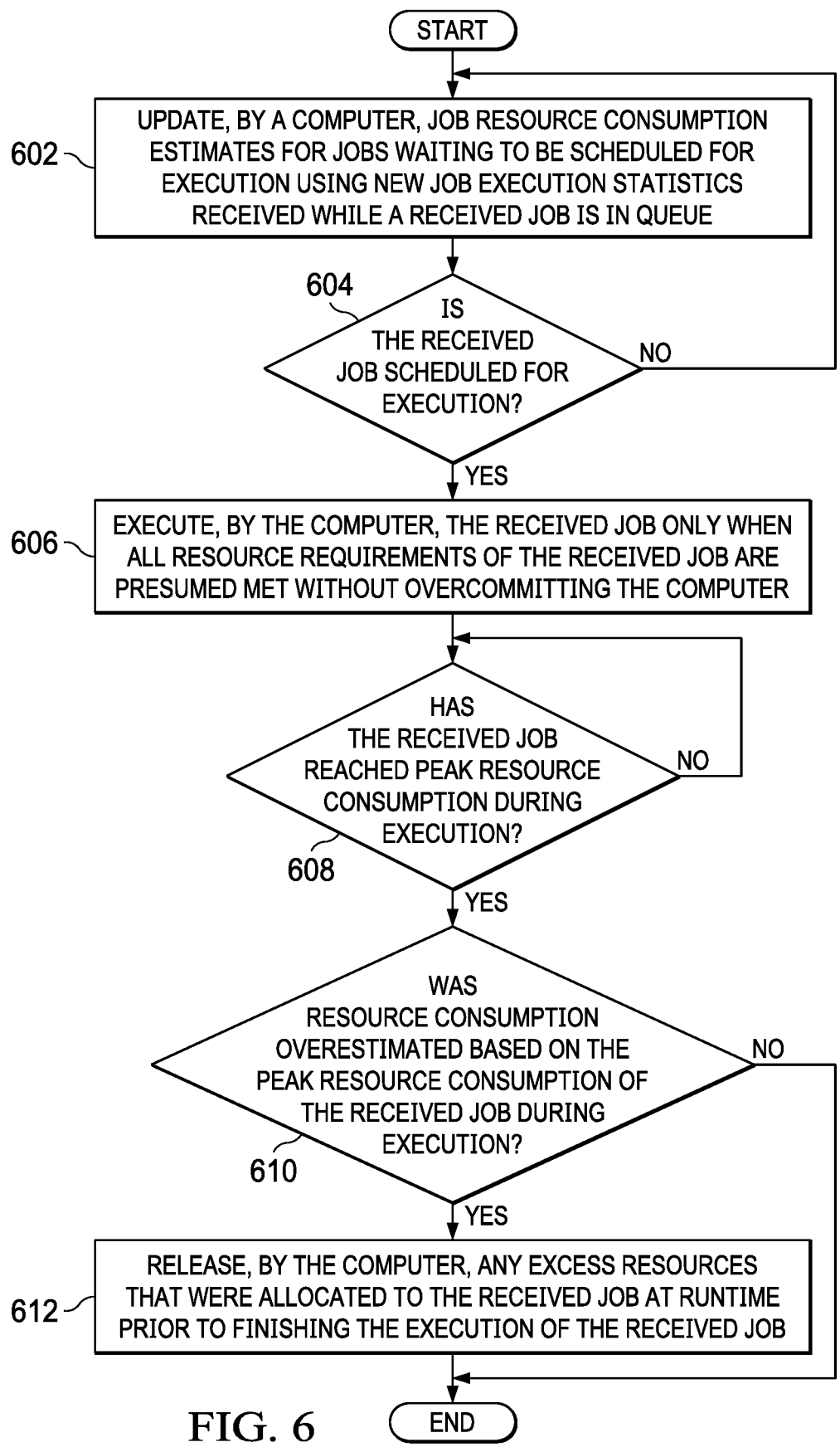
FIG. 6 is a flowchart illustrating a process for releasing excess resources allocated to a job prior to finishing execution of the job in accordance with an illustrative embodiment.

With reference now to FIG. 6, a flowchart illustrating a process for releasing excess resources allocated to a job prior to finishing execution of the job is shown in accordance with an illustrative embodiment. The process shown in FIG. 6 may be implemented in a computer, such as, for example, server 104 in FIG. 1 or data processing system 200 in FIG. 2.

The process begins when the computer updates job resource consumption estimates for jobs waiting to be scheduled for execution using new job execution statistics received while a received job is in queue (step 602). The computer makes a determination as to whether the received job is scheduled for execution (step 604). If the computer determines that the received job is not scheduled for execution, no output of step 604, then the process returns to step 602 where the computer continues to update job resource consumption estimates for jobs waiting to be scheduled for execution. If the computer determines that the received job is scheduled for execution, yes output of step 604, then the computer executes the received job only when all resource requirements of the received job are presumed met without overcommitting the computer (step 606).

Afterward, the computer makes a determination as to whether the received job reached peak resource consumption during execution (step 608). If the computer determines that the received job has not reached peak resource consumption during execution, no output of step 608, then the process returns to step 608 where the computer waits for the received job to reach peak resource consumption. If the computer determines that the received job has reached peak resource consumption during execution, yes output of step 608, then the computer makes a determination as to whether resource consumption was overestimated based on the peak resource consumption of the received job during execution (step 610).

If the computer determines that resource consumption was not overestimated based on the peak resource consumption of the received job during execution, no output of step 610, then the process terminates thereafter. If the computer determines that resource consumption was overestimated based on the peak resource consumption of the received job during execution, yes output of step 610, then the computer releases any excess resources that were allocated to the received job at runtime prior to finishing the execution of the received job (step 612). Thereafter, the process terminates.

Figure 7:
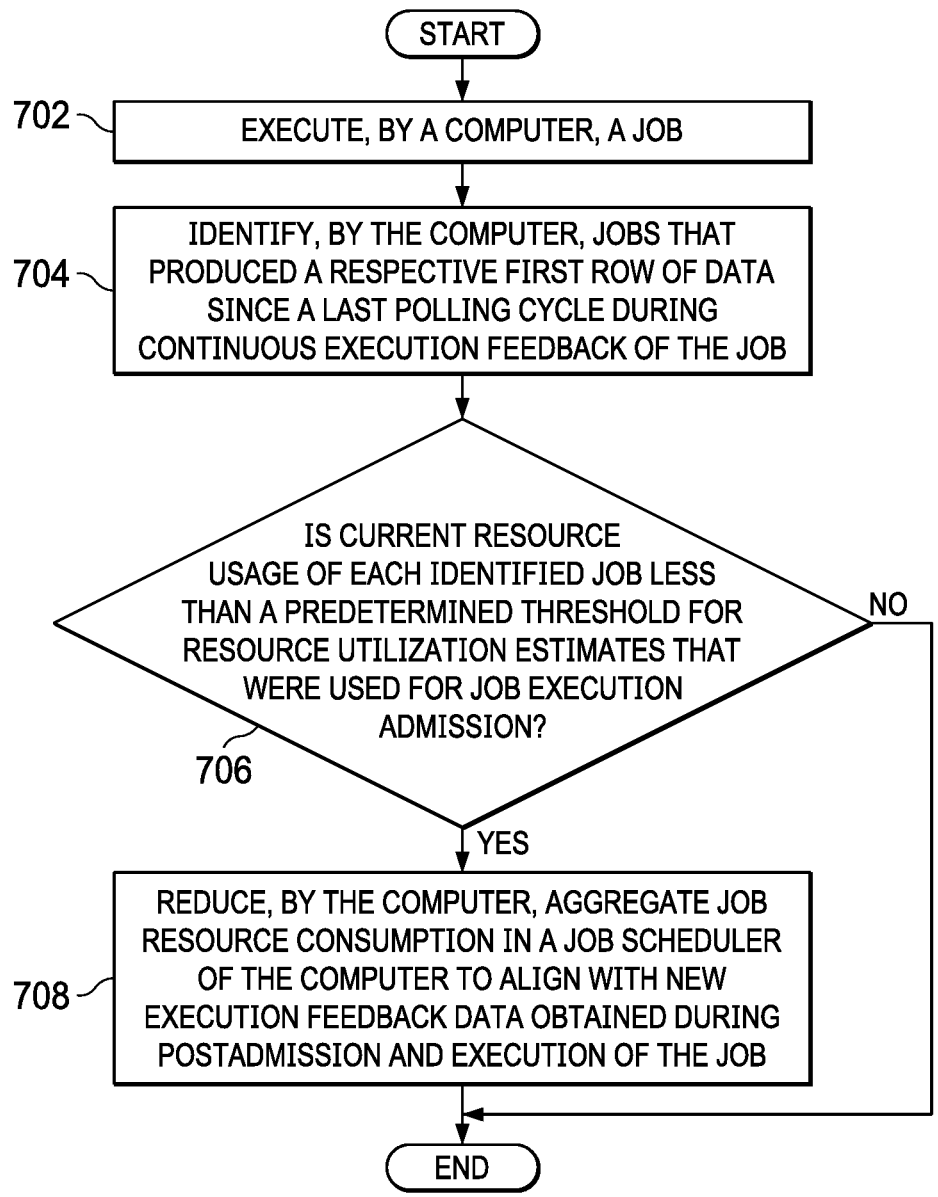
FIG. 7 is a flowchart illustrating a process for reducing aggregate job resource consumption during postadmission and execution of a job in accordance with an illustrative embodiment.

With reference now to FIG. 7, a flowchart illustrating a process for reducing aggregate job resource consumption during postadmission and execution of a job is shown in accordance with an illustrative embodiment. The process shown in FIG. 7 may be implemented in a computer, such as, for example, server 104 in FIG. 1 or data processing system 200 in FIG. 2.

The process begins when the computer executes a job (step 702). The computer identifies jobs that produced a respective first row of data since a last polling cycle during continuous execution feedback of the job (step 704). The computer makes a determination as to whether current resource usage of each identified job is less than a predetermined threshold for resource utilization estimates that were used for job execution admission (step 706). If the computer determines that current resource usage of each identified job is greater than the predetermined threshold for resource utilization estimates that were used for job execution admission, no output of step 706, then the process terminates thereafter. If the computer determines that current resource usage of each identified job is less than the predetermined threshold for resource utilization estimates that were used for job execution admission, yes output of step 706, then the computer reduces aggregate job resource consumption in a job scheduler of the computer to align with new execution feedback data obtained during postadmission and execution of the job (step 708). Thereafter, the process terminates.

Thus, illustrative embodiments of the present invention provide a computer-implemented method, computer system, and computer program product for automatically controlling workload job admission for execution based on predicted job resource utilization and execution time estimates and continuous real time job execution feedback data. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for predictive job admission control, the computer-implemented method comprising:

responsive to a computer receiving a job for execution, generating, by the computer, a predicted resource utilization estimate for the job prior to admission of the job to execution;

searching, by the computer, for historic job execution statistics corresponding to the job;

determining, by the computer, whether corresponding historic job execution statistics were found during the searching;

responsive to the computer determining that corresponding historic job execution statistics were found during the searching, adjusting, by the computer, the predicted resource utilization estimate for the job prior to admission of the job to execution based on the corresponding historic job execution statistics found during the searching to form an adjusted resource utilization estimate; and scheduling, by the computer, the job for execution based on the adjusted resource utilization estimate.

2. The computer-implemented method of claim 1 further comprising:

starting, by the computer, execution of the job based on job scheduling;

determining, by the computer, whether the job is high risk;

responsive to the computer determining that the job is high-risk, determining, by the computer, whether resource utilization of the job is increasing; and responsive to the computer determining that the resource utilization of the job is not increasing, releasing, by the computer, excess allocated resource uncertainty budget down to the greater of current resource utilization of the job or an original non-worst-case estimate.

3. The computer-implemented method of claim 1 further comprising:

starting, by the computer, execution of the job based on job scheduling;

responsive to the computer starting the execution of the job, determining, by the computer, whether the job has generated a threshold amount of data;

responsive to the computer determining that the job has generated the threshold amount of data, determining, by the computer, whether current resource utilization of the job is below the adjusted resource utilization estimate; and responsive to the computer determining that the current resource utilization of the job is below the adjusted resource utilization estimate, performing, by the computer, a post peak job resource utilization adjustment to reduce resource allocation to the job.

4. The computer-implemented method of claim 1 further comprising:

responsive to the computer determining that corresponding historic job execution statistics were not found during the searching, classifying, by the computer, the job as an unknown job;

performing, by the computer, an analysis of recent execution data corresponding to executing jobs over a variable sampling window to identify one of underestimation and overestimation of resource utilization; and determining, by the computer, whether overestimation of resource utilization is identified based on the analysis.

5. The computer-implemented method of claim 4 further comprising:

responsive to the computer determining that overestimation of resource utilization is not identified based on the analysis, applying, by the computer, an underestimation error correction model to predict resource utilization of the job; and responsive to the computer determining that overestimation of resource utilization is identified based on the analysis, applying, by the computer, an overestimation error correction model to predict resource utilization of the job.

6. The computer-implemented method of claim 4 further comprising:

determining, by the computer, whether the unknown job is a high-risk job based on risk factors; and responsive to the computer determining that the unknown job is a high-risk job based on the risk factors, utilizing, by the computer, a worst-case resource utilization estimate for the job.

7. The computer-implemented method of claim 1 further comprising:

aggregating, by the computer, resource utilization and execution time statistics corresponding to similar jobs from prior executions; and indexing, by the computer, the resource utilization and execution time statistics by hashing key attributes of execution plans corresponding to the similar jobs to generalize the resource utilization and execution time statistics so that an exact execution plan match is not required to retain high predictive accuracy.

8. The computer-implemented method of claim 7 further comprising:

generating, by the computer, an execution plan for the job;

hashing, by the computer, the execution plan for the job;

determining, by the computer, whether a hash on key attributes of similar execution plans match the hash of the execution plan for the job; and responsive to the computer determining that a hash on key attributes of similar execution plans does match the hash of the execution plan for the received job, substituting, by the computer, aggregated resource utilization and execution time statistics corresponding to the similar jobs for an initial predictive resource utilization estimate of the job to increase accuracy of the initial predictive resource utilization estimate and form the adjusted resource utilization estimate for the job.

9. The computer-implemented method of claim 1 further comprising:

utilizing, by the computer, a continuous real time process of monitoring a workload manager view of expected resource consumption on the computer in comparison with actual resource consumption to identify a difference;

responsive to the computer determining that the difference indicates an underestimation of resource consumption, applying, by the computer, a predetermined underestimation model to calculate a variable error correction adjustment for predicted resource consumption of the job over a variable sampling window; and responsive to the computer determining that the difference indicates an overestimation of resource consumption, applying, by the computer, a predetermined overestimation model to calculate the variable error correction adjustment for the predicted resource consumption of the job over the variable sampling window.

10. The computer-implemented method of claim 1 further comprising:

updating, by the computer, job resource consumption estimates for jobs waiting to be scheduled for execution using new job execution statistics received while the job is in queue;

determining, by the computer, whether the job is scheduled for execution; and responsive to the computer determining that the job is scheduled for execution, executing, by the computer, the job only when all resource requirements of the job are presumed met without overcommitting the computer.

11. The computer-implemented method of claim 10 further comprising:

determining, by the computer, whether the job reached peak resource consumption during execution;

responsive to the computer determining that the job has reached peak resource consumption during execution, determining, by the computer, whether resource consumption was overestimated based on the peak resource consumption of the job during the execution; and responsive the computer determining that the resource consumption was overestimated based on the peak resource consumption of the job during the execution, releasing, by the computer, excess resources that were allocated to the received job at runtime prior to finishing the execution of the j ob.

12. The computer-implemented method of claim 1 further comprising:
   executing, by the computer, the job;
   identifying, by the computer, jobs that returned a respective first row of data since a last polling cycle during continuous execution feedback of the job;
   determining, by the computer, whether current resource usage of each identified job is less than a predetermined threshold for resource utilization estimates that were used for job execution admission; and
   responsive to the computer determining that the current resource usage of each identified job is less than the predetermined threshold for resource utilization estimates that were used for job execution admission, reducing, by the computer, aggregate job resource consumption in a job scheduler of the computer to align with new execution feedback data obtained during postadmission and execution of the job.

13. A computer system for predictive job admission control, the computer system comprising:
   a bus system;
   a storage device connected to the bus system, wherein the storage device stores program instructions; and
   a processor connected to the bus system, wherein the processor executes the program instructions to:
      generate a predicted resource utilization estimate for a job in response to receiving the job for execution;
      search for historic job execution statistics corresponding to the job;
      determine whether corresponding historic job execution statistics were found during the search;
      adjust the predicted resource utilization estimate for the job prior to admission of the job to execution based on the corresponding historic job execution statistics found during the search to form an adjusted resource utilization estimate in response to determining that the corresponding historic job execution statistics were found during the search; and
      schedule the job for execution based on the adjusted resource utilization estimate.

14. The computer system of claim 13, wherein the processor further executes the program instructions to:
   start execution of the job based on job scheduling;
   determine whether the job has generated a threshold amount of data in response to starting the execution of the job;
   determine whether current resource utilization of the job is below the adjusted resource utilization estimate in response to determining that the job has generated the threshold amount of data; and
   perform a post peak job resource utilization adjustment to reduce resource allocation to the job in response to determining that the current resource utilization of the job is below the adjusted resource utilization estimate.

15. A computer program product for predictive job admission control, the computer program product comprising a computer readable storage medium having program instructions embodied therewith, the program instructions executable by a computer to cause the computer to perform a method comprising:
   responsive to the computer receiving a job for execution, generating, by the computer, a predicted resource utilization estimate for the job;
   searching, by the computer, for historic job execution statistics corresponding to the job;
   determining, by the computer, whether corresponding historic job execution statistics were found during the searching;
   responsive to the computer determining that corresponding historic job execution statistics were found during the searching, adjusting, by the computer, the predicted resource utilization estimate for the job prior to admission of the job to execution based on the corresponding historic job execution statistics found during the searching to form an adjusted resource utilization estimate; and
   scheduling, by the computer, the job for execution based on the adjusted resource utilization estimate.

16. The computer program product of claim 15 further comprising:
   starting, by the computer, execution of the job based on job scheduling;
   responsive to the computer starting the execution of the job, determining, by the computer, whether the job has generated a threshold amount of data;
   responsive to the computer determining that the job has generated the threshold amount of data, determining, by the computer, whether current resource utilization of the job is below the adjusted resource utilization estimate; and
   responsive to the computer determining that the current resource utilization of the job is below the adjusted resource utilization estimate, performing, by the computer, a post peak job resource utilization adjustment to reduce resource allocation to the job.

17. The computer program product of claim 15 further comprising:
   responsive to the computer determining that corresponding historic job execution statistics were not found during the searching, classifying, by the computer, the job as an unknown job;
   performing, by the computer, an analysis of recent execution data corresponding to executing jobs over a variable sampling window to identify one of underestimation and overestimation of resource utilization; and
   determining, by the computer, whether overestimation of resource utilization is identified based on the analysis.

18. The computer program product of claim 17 further comprising:
   responsive to the computer determining that overestimation of resource utilization is not identified based on the analysis, applying, by the computer, an underestimation error correction model to predict resource utilization of the job; and
   responsive to the computer determining that overestimation of resource utilization is identified based on the analysis, applying, by the computer, an overestimation error correction model to predict resource utilization of the job.

19. The computer program product of claim 17 further comprising:
   determining, by the computer, whether the unknown job is a high-risk job based on risk factors; and
   responsive to the computer determining that the unknown job is a high-risk job based on the risk factors, utilizing, by the computer, a worst-case resource utilization estimate for the job.

20. The computer program product of claim 15 further comprising:
   aggregating, by the computer, resource utilization and execution time statistics corresponding to similar jobs from prior executions;

indexing, by the computer, the resource utilization and execution time statistics by hashing key attributes of execution plans corresponding to the similar jobs to generalize the resource utilization and execution time statistics so that an exact execution plan match is not required to retain high predictive accuracy;

generating, by the computer, an execution plan for the job;

hashing, by the computer, the execution plan for the job;

determining, by the computer, whether a hash on key attributes of similar execution plans match the hash of the execution plan for the job; and responsive to the computer determining that a hash on key attributes of similar execution plans does match the hash of the execution plan for the received job, substituting, by the computer, aggregated resource utilization and execution time statistics corresponding to the similar jobs for an initial predictive resource utilization estimate of the job to increase accuracy of the initial predictive resource utilization estimate and form the adjusted resource utilization estimate for the job.

* * * * *